Patented July 6, 1943

2,323,631

UNITED STATES PATENT OFFICE 2,323,631

REGENERATION OF DEACTIVATED CUPROUS CHLORIDE SOLUTIONS

Robert Stadler, Heidelberg, and Albert Auerhahn, Neckargemuend, Germany; vested in the Alien Property Custodian No Drawing. Application March 16, 1940, Serial No. 324,384. In Germany January 25, 1939

4 Claims. (Cl. 252—239)

The present invention relates to improvements in the production of vinyl acetylene. More particularly, it relates to improvements in the process of regenerating deactivated cuprous chloride solutions which have been employed to catalyze the conversion of acetylene into vinyl acetylene.

For the manufacture and production of vinyl acetylene by the dimerization of acetylene in the liquid phase, it has already been proposed to employ as contact liquids aqueous solutions of cuprous chloride. In operating this process, there are formed besides vinyl acetylene also high molecular tarry and resinous by-products which cause a decrease in the catalytic activity of the cuprous chloride solution. The addition of acids to the cuprous chloride solution in order to increase the serviceable life thereof, may prevent a rapid decrease in the catalytic activity; however, it does not dispense with the necessity of regenerating the catalyst.

We have now found that cuprous chloride contact solutions which have been used in the production of vinyl acetylene from acetylene may be easily regenerated by heating them together with hydrochloric acid. Cuprous chloride solutions treated according to our invention may again be used in the production of vinyl acetylene, if desired, after having converted cupric chloride which may be present into cuprous chloride. This surprising result involves the great advantage that the difficulties and inconveniences connected with the known regeneration of spent cuprous chloride solutions by means of chlorine can be dispensed with altogether.

In carrying out our invention, we add concentrated hydrochloric acid to the spent cuprous chloride solution. The amount of concentrated hydrochloric acid may vary considerably. We prefer to add an amount corresponding to from about 1 to 15 per cent of the weight of the spent solution. Instead of adding concentrated hydrochloric acid, we may introduce a corresponding amount of gaseous hydrogen chloride thereby forming hydrochloric acid within the contact solution.

The mixture of spent contact solution and hydrochloric acid may then be allowed to stand for some time. It is then heated, preferably below its boiling point, generally speaking within the range of from about 60 to 95° C. The heating may be discontinued, when a sample withdrawn from the solution yields, after filtration and addition of water, a pure cuprous chloride precipitate. During the heating, the presence of oxygen should be excluded in order to prevent the oxidation of the cuprous chloride. It is also preferable to exclude free acetylene which may form undesirable by-products.

The solution contains a certain amount of a voluminous precipitate wherein a small amount of copper or copper compounds are embodied. Before using the solution again for the production of vinyl acetylene, this precipitate is separated off, preferably by filtration. The copper contained in the precipitate may easily be converted into cement-copper.

The filtrate may be used without further treatment immediately for the conversion of acetylene into vinyl acetylene. If the filtrate contains substantial amounts of cupric chloride, powdered copper may be added in order to reduce this to cuprous chloride.

The regeneration of contact solutions may be carried out continuously even without interrupting the production of vinyl acetylene. This may be done, for example, by branching off part of the contact liquid, adding thereto hydrochloric acid, heating it, preferably in the absence of substantial amounts of oxygen and acetylene, separating off the precipitate, adding, if desired, fresh cuprous chloride corresponding to the amount of copper contained in the precipitate, and leading back the solution into the reaction vessel.

Our invention will be illustrated in the following examples in respect to cuprous chloride solutions containing ammonium chloride. It will, however, be understood that our novel process is likewise applicable to other contact solutions capable of promoting the conversion of acetylene into vinyl acetylene and containing besides cuprous chloride another ammonium salt or an amine salt or also an acid constituent.

Example 1

Into a solution consisting of 147 kilograms of cuprous chloride, 90 kilograms of ammonium chloride and 150 liters of water there are led per hour 32 cubic meters of acetylene. The yield of vinyl acetylene amounts to 34 grams per hour for 1 kilogram of cuprous chloride; the concentration of vinyl acetylene in the reaction gases is 71 per cent. This rate of conversion steadily decreases. After it has reached 25 per cent and after the contact solution starts to foam, the process is discontinued. The solution is allowed to stand for three days at room temperature, while excluding air. For 1 liter of the solution 30 cubic centimeters of commercial hydrochloric acid (36 per cent) are added and the whole is heated to 80° C. for 5 hours. The solution is filtered off and 1 kilogram of powdered copper and 1.5 kilograms of solid cuprous chloride are added to the greenish-black colored filtrate. It is then again used as contact liquid. When leading acetylene into the solution under the conditions referred to above, 42 grams of vinyl acetylene per hour for 1 kilogram of cuprous chloride are obtained. The concentration of vinyl acetylene in the reaction gases now amounts to 80 per cent.

*Example 2*

A column is charged with a mixture of 110 kilograms of cuprous chloride, 75 kilograms of ammonium chloride, 1 kilogram of powdered copper and 110 liters of water. 30 cubic meters of acetylene per hour are led through the contact liquid at 90° C. When the decrease in the yield of vinyl acetylene indicates that the reaction has slowed up, 10 per cent of the contact liquid are withdrawn into a separate vessel which is heated to from 70 to 80° C. 10 cubic centimeters of 36 per cent hydrochloric acid are added for 1 liter of the cuprous chloride solution and a current of nitrogen is led through the solution. After about 15 minutes a sample withdrawn and filtered yields a pure cuprous chloride precipitate when diluted with water. The bulk of the solution is then filtered and given back into the column.

This regeneration is repeated as soon as the activity of the contact liquid decreases substantially. From time to time, the total loss of cuprous chloride is determined and a corresponding amount thereof added to the contact liquid.

What we claim is:

1. The process of regenerating deactivated cuprous chloride solutions which have been employed to catalyze the conversion of acetylene into vinyl acetylene which comprises adding to said deactivated solution an amount of hydrochloric acid equal to 1–15% by weight of said solution, heating the thus acidified solution in the absence of oxygen and free acetylene to a temperature of 60° to 95° C. until a filtered sample thereof on dilution with water yields a pure cuprous chloride precipitate, thereafter filtering the thus treated solution, and recovering as the filtrate a regenerated cuprous chloride solution having a catalytic effect for said conversion reaction equal to freshly prepared cuprous chloride solutions.

2. The process of regenerating deactivated cuprous chloride solutions which have been employed to catalyze the conversion of acetylene into vinyl acetylene which comprises adding to said deactivated solution an amount of hydrochloric acid equal to 1–15% by weight of said solution, heating the thus acidified solution in the absence of oxygen and free acetylene to a temperature of 60° to 95° C. until a filtered sample thereof on dilution with water yields a pure cuprous chloride precipitate, thereafter filtering the thus treated solution and adding a minor amount of powdered copper to the thus obtained filtrate, whereby there is obtained as said filtrate a regenerated cuprous chloride solution having a catalytic effect for said conversion reaction equal to freshly prepared cuprous chloride solutions.

3. The process of regenerating deactivated cuprous chloride solutions which have been employed to catalyze the conversion of acetylene into vinyl acetylene which comprises adding to said deactivated solution an amount of hydrochloric acid equal to 1–15% by weight of said solution, heating the thus acidified solution in the absence of oxygen and free acetylene to a temperature of 60° to 95° C. until a filtered sample thereof on dilution with water yields a pure cuprous chloride precipitate, thereafter filtering the thus treated solution and adding to the thus obtained filtrate an amount of cuprous chloride corresponding to the amount of copper contained in the precipitate obtained in said filtration, whereby there is obtained as said filtrate a regenerated cuprous chloride solution having a catalytic effect for said conversion reaction equal to freshly prepared cuprous chloride solutions.

4. The process as defined in claim 1 wherein said solution comprises an aqueous solution of cuprous chloride and ammonium chloride.

ROBERT STADLER.
ALBERT AUERHAHN.